(12) United States Patent
Chung et al.

(10) Patent No.: US 9,063,383 B2
(45) Date of Patent: Jun. 23, 2015

(54) LIQUID CRYSTAL DISPLAY DEVICE

(71) Applicant: Infovision Optoelectronics (Kunshan) Co., Ltd., JiangSu Province (CN)

(72) Inventors: Te-Chen Chung, JiangSu Province (CN); Yong-qian Li, JiangSu Province (CN); Chia-Te Liao, JiangSu Province (CN); Yu-Wen Chiu, JiangSu Province (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 225 days.

(21) Appl. No.: 13/693,053

(22) Filed: Dec. 4, 2012

(65) Prior Publication Data

US 2013/0329168 A1    Dec. 12, 2013

(30) Foreign Application Priority Data

Jun. 7, 2012 (CN) .......................... 2012 1 0186741

(51) Int. Cl.
*G02F 1/1343* (2006.01)
*G02F 1/1337* (2006.01)
*G02F 1/1335* (2006.01)
*G02F 1/137* (2006.01)

(52) U.S. Cl.
CPC .... *G02F 1/134336* (2013.01); *G02F 1/133784* (2013.01); *G02F 1/133528* (2013.01); *G02F 1/134309* (2013.01); *G02F 2001/134381* (2013.01); *G02F 2001/13712* (2013.01)

(58) Field of Classification Search
CPC .......................... G02F 1/134363; G02F 1/1343
USPC .................................................. 349/141, 144
See application file for complete search history.

(56) References Cited

U.S. PATENT DOCUMENTS

| | | | |
|---|---|---|---|
| 8,587,619 B2* | 11/2013 | Kim et al. ..................... | 345/690 |
| 2002/0159016 A1* | 10/2002 | Nishida et al. ................ | 349/141 |
| 2005/0024548 A1* | 2/2005 | Choi et al. ....................... | 349/43 |
| 2005/0253978 A1* | 11/2005 | Chae et al. ....................... | 349/43 |
| 2009/0091587 A1* | 4/2009 | Kim et al. ..................... | 345/690 |
| 2012/0169981 A1* | 7/2012 | Murata et al. ................. | 349/138 |
| 2014/0036192 A1* | 2/2014 | Iyama et al. ..................... | 349/46 |

FOREIGN PATENT DOCUMENTS

JP          2002365657 A  *  12/2002   ............ G02F 1/1343

* cited by examiner

*Primary Examiner* — Hoan C Nguyen
(74) *Attorney, Agent, or Firm* — Ding Yu Tan

(57) ABSTRACT

A liquid crystal display device includes a first substrate, a second substrate opposite to the first substrate, and a liquid crystal (LC) layer sandwiched between the two substrates. The first substrate includes gate lines and data lines, and the gate lines and the data lines data lines are intersected with each other to define pixel areas. Each of the pixel areas includes a pixel electrode and first common electrodes arranged at different layers, and the first common electrodes are electrically coupled to each other. The second substrate includes a second common electrode, and the LC layer comprises negative LC molecules.

18 Claims, 17 Drawing Sheets

LIQUID CRYSTAL DISPLAY DEVICE

CROSS-REFERENCE TO RELATED APPLICATION

This application claims priority from Chinese Patent Application No. 201210186741.4 filed on Jun. 7, 2012. The contents of the above-mentioned patent application is hereby incorporated by reference herein in its entirety and made a part of this specification.

FIELD OF THE INVENTION

The present invention relates to the field of liquid crystal display (LCD), and more particularly to an LCD device.

BACKGROUND OF THE INVENTION

Thin Film Transistor-Liquid Crystal Display (TFT-LCD) has been widely used of various applications in flat panel display field due to characteristics of low radiation thin thickness and low power consumption, etc. Most of desktop TFT-LCD devices are based on twisted nematic (TN) mode. However, the first electrode and the second electrode of traditional TN mode LCD device are separately formed on an upper substrate and a lower substrate, and liquid crystal (LC) molecules sandwiched between the upper substrate and the lower substrate rotate in the plane orthogonal to the two substrates. Due to the optical anisotropy of the LC molecules, optical paths are different after light beams pass through the LC molecules from different angles and enter human eyes. Therefore, optical path difference reliably causes different display effects at different viewing angles.

In order to solve or overcome the problem of viewing angle variation caused by the optical path difference, a method of adding compensation films in a TN mode LCD device is generally used to improve the viewing angle, due to the lower requirement of viewing angle in a personal and working environment. However, some products such as television, hand-held personal digital assistant (PDA) have higher viewing angle requirement. Therefore, some new improved LCD modes, such as multi-domain vertical alignment (MVA) mode, optically compensated bend mode, fringe field switching (FFS) mode, in-plane switch (IPS) mode, and other wide viewing angle technologies have been developed and applied to relevant products.

Because the technical threshold is low, the method of adding compensation films in the TN mode LCD device is broadly applied. However, due to the compensation film having singular definite optical property, the compensation film cannot compensate an arbitrary viewing angle at an arbitrary gray level. Therefore, an inherent gray level inversion phenomenon of the TN mode LCD device still exists.

Due to employing negative LC material and protuberance structure or complex electrode arrangement, a response time of an MVA mode LCD device is long, and a manufacturing process of the MVA mode LCD device is complicated. Furthermore, a vertical alignment (VA) mode LCD device is liable to generate serious mura effect when being touched, and is thereby unsuited to be combined with touch technology.

Even though an Optically Compensated Bend (OCB) mode LCD device has inherent optical self-compensation effect and high response speed, a special arrangement of LC molecules is liable to cause some start-up problems, and ability to maintain uniformity in the manufacturing process for solving the start-up problems becomes a new difficult question in the display industry Due to the higher technical threshold and existing patent monopoly about FFS mode LCD devices and IPS mode LCD devices being formed, using FFS and IPS display technologies requires of higher costs.

What is needed, therefore, is an improved LCD device that can overcome the above-described problems.

SUMMARY OF INVENTION

Accordingly, an LCD device in accordance with an embodiment is adapted, and includes a first substrate, a second substrate opposite to the first substrate, and an LC layer sandwiched between the first substrate and the second substrate. The LC layer comprises negative LC molecules. The first substrate includes a plurality of gate lines and data lines, and the gate lines and the data lines are intersected with each other to define a plurality of pixel areas. Each of the pixel areas includes a pixel electrode and a plurality of first common electrodes which are arranged at different layers respectively. The pixel electrode includes a plurality of first pixel-electrode portions and a plurality of second pixel-electrode portions. The first pixel-electrode portions and the second pixel-electrode portions are electrically coupled to each other, are arranged at the same layer, and are intersected with each other to define a plurality of sub-pixel areas. The second substrate includes a second common electrode.

Another LCD device is adapted, and includes a plurality of gate lines and a plurality of data lines intersected with the gate lines to define a plurality of pixel areas. Each of the pixel areas includes a pixel electrode and a plurality of first common electrodes. The pixel electrode includes a plurality of first pixel-electrode portions and a plurality of second pixel-electrode portions. The first pixel-electrode portions and the second pixel-electrode portions are electrically coupled together and are arranged at a same layer, and the first pixel-electrode portions are intersected with the second pixel-electrode portions to define a plurality of sub-pixel areas. The first common electrodes are electrically coupled with each other. The pixel electrode and the first common electrodes are arranged at different layers in a same substrate. The LCD device further includes a second common electrode arranged in another substrate opposite to the substrate where the pixel electrode and the first common electrodes are arranged in. In summary, the LCD device of the present invention employs the tri-electrode structure with the negative LC molecules, which is different from the conventional IPS mode LCD device and FFS mode LCD device, and plays an important role in breaking the technical monopoly of the IPS mode LCD device and the FFS mode LCD device.

Other novel features and advantages will become more apparent from the following detailed description when taken in conjunction with the accompanying drawings.

DETAILED DESCRIPTION OF EMBODIMENTS

In order to make the purpose, the features and the advantages of the embodiments of the present invention become more readily apparent. The present invention will now be described more specifically with reference to the following embodiments.

It is to be noted that the accompanying drawings of the present invention merely show the essential structure features related to the spirit of the invention, and omit other obvious structure features.

Figure 1:
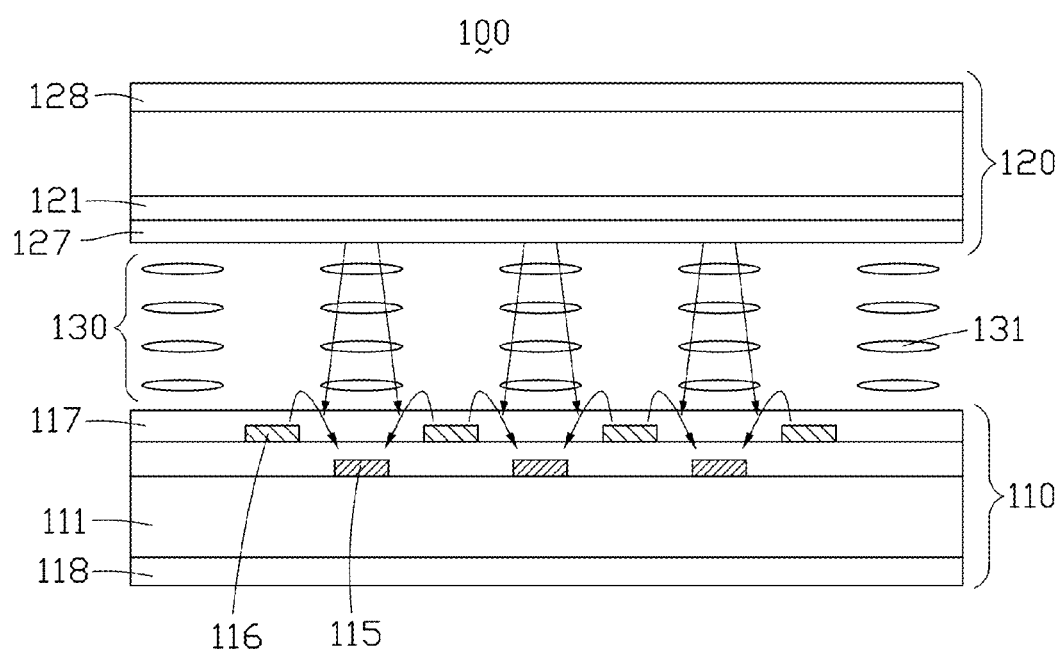
FIG. 1 is a cross-sectional view of a portion of an LCD device according to an embodiment of the invention.

FIG. 1 is a cross-sectional view of a portion of an LCD device according to an embodiment of the invention. Referring to FIG. 1, the LCD device 100 according to the embodiment of the invention includes a first substrate 110, a second substrate 120 disposed opposite to the first substrate 110, and a LC layer 130 sandwiched between the first substrate 110 and the second substrate 120.

Specifically, FIGS. 2-3 and 4a-4c schematically show a plurality of structural plan views of the first substrate 110 of FIG. 1. For the sake of brevity, FIG. 2 merely shows a structure plan view of one pixel area P in the first substrate 110. Referring to FIGS. 2-3 and 4a-4c, the first substrate 110 of the LCD device 100 includes a transparent base 111, a plurality of gate lines 112, a plurality of data lines 113, and a plurality of thin film transistors (TFTs) 114 disposed at intersections of the gate lines 112 and the data lines 113. The gate lines 112, the data lines 113, and the TFTs 114 are formed on the transparent base 111.

Each TFT 114 includes a gate electrode 1141 electrically coupled to one corresponding gate line 112, a semiconductor layer 1142, a source electrode 1143 electrically coupled to one corresponding data line 113, and a drain electrode 1144 electrically coupled to a pixel electrode 115.

The gate lines 112 and the data lines 113 are insulated and intersected with each other to define a plurality of pixel areas P. That is, each two adjacent gate lines 112 and each two adjacent data lines 113 are intersected with each other to define one pixel area P. Preferably, the gate lines 112 are substantially perpendicular to the data lines 113.

Each pixel area P includes a pixel electrode 115 and a plurality of first common electrodes 116. The first common electrodes 116 are electrically coupled to each other. Referring to FIGS. 2-3 again, the pixel electrode 115 has a mesh-shaped structure, and includes a plurality of first pixel-electrode portions 1151 and a plurality of second pixel-electrode portions 1152. The first pixel-electrode portions 1151 and the second pixel-electrode portions 1152 are arranged at the same layer, and are intersected with each other to define a plurality of sub-pixel areas P1. The first pixel-electrode portions 1151 each are approximately strip-shaped and substantially parallel to each other, and are electrically coupled to each other. The second pixel-electrode portions 1152 each are approximately strip-shaped and substantially parallel to each other, and are electrically coupled to each other. In addition, the first pixel-electrode portions 1151 and the second pixel-electrode portions 1152 are electrically coupled together, thereby to form the pixel electrode 115 of the pixel area P, and the pixel electrode 115 is electrically coupled to the drain electrode 1144 of a corresponding TFT 114.

Preferably, the first pixel-electrode portions 1151 are substantially perpendicular to the second pixel-electrode portions 1152. The first pixel-electrode portions 1151 are substantially parallel to the gate lines 112, and the second pixel-electrode portions 1152 are substantially parallel to the data lines 113. Therefore, the LCD device 100 has a regular pixel structure.

The first common electrodes 116 of the pixel area P each are approximately strip-shaped and substantially parallel to each other and electrically coupled to each other, and are electrically coupled to a common line (not labeled). In this embodiment, in each pixel area P, each first common electrode 116 is disposed between two corresponding adjacent second pixel-electrode portions 1152, and is substantially parallel to the second pixel-electrode portions 1152. Preferably, each first common electrode 116 is disposed in the middle between two corresponding adjacent second pixel-electrode portions 1152.

Preferably, the first common electrodes 116 are disposed substantially perpendicular to the first pixel-electrode portions 1151 and substantially parallel to the second pixel-electrode portions 1152 of the pixel electrode 115. One of ordinarily skill in the art can understand that, in another alternative embodiment, a certain angle can be defined between the first common electrodes 116 and the first pixel-electrode portions 1151. For example, the angle between the first common electrodes 116 and the first pixel-electrode portions 1151 can be defined in a range from 50 to 150 degrees, to improve on a response speed of the LC molecules.

The first common electrodes 116 and the pixel electrode 115 are respectively arranged at different layers, and an insulation layer (not shown) is disposed between the first common electrodes 116 and the pixel electrode 115 to electrically insulate the first common electrodes 116 and the pixel electrode 115. In this embodiment, the first pixel-electrode portions 1151 and the second pixel-electrode portions 1152 of the pixel electrode 115 and the first common electrodes 116 are transparent electrodes, and maybe formed by transparent conductor materials, such as indium tin oxide (ITO), for example.

Figure 2:
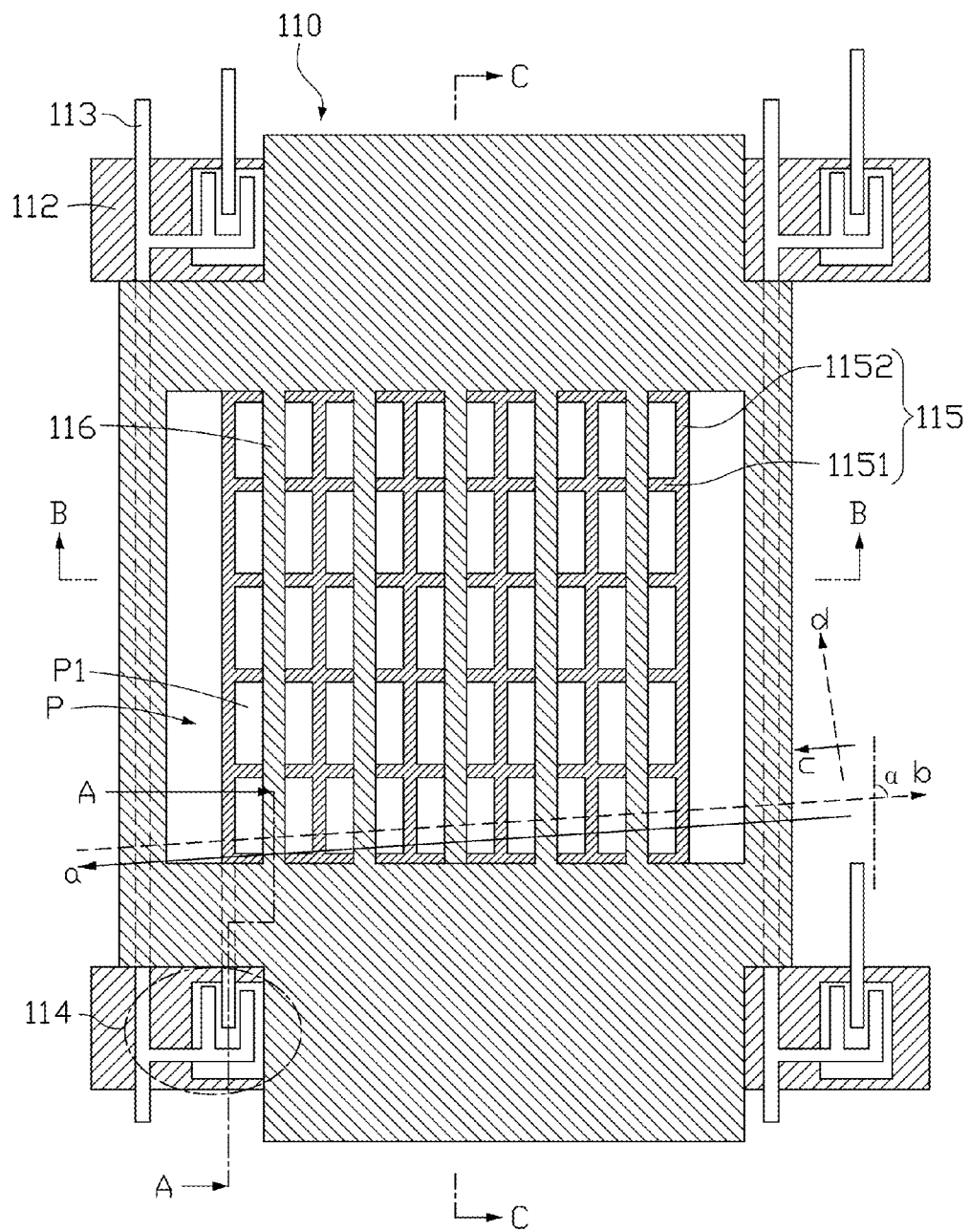
FIG. 2 is a structural plan view of the first substrate of FIG. 1.
Figure 3:
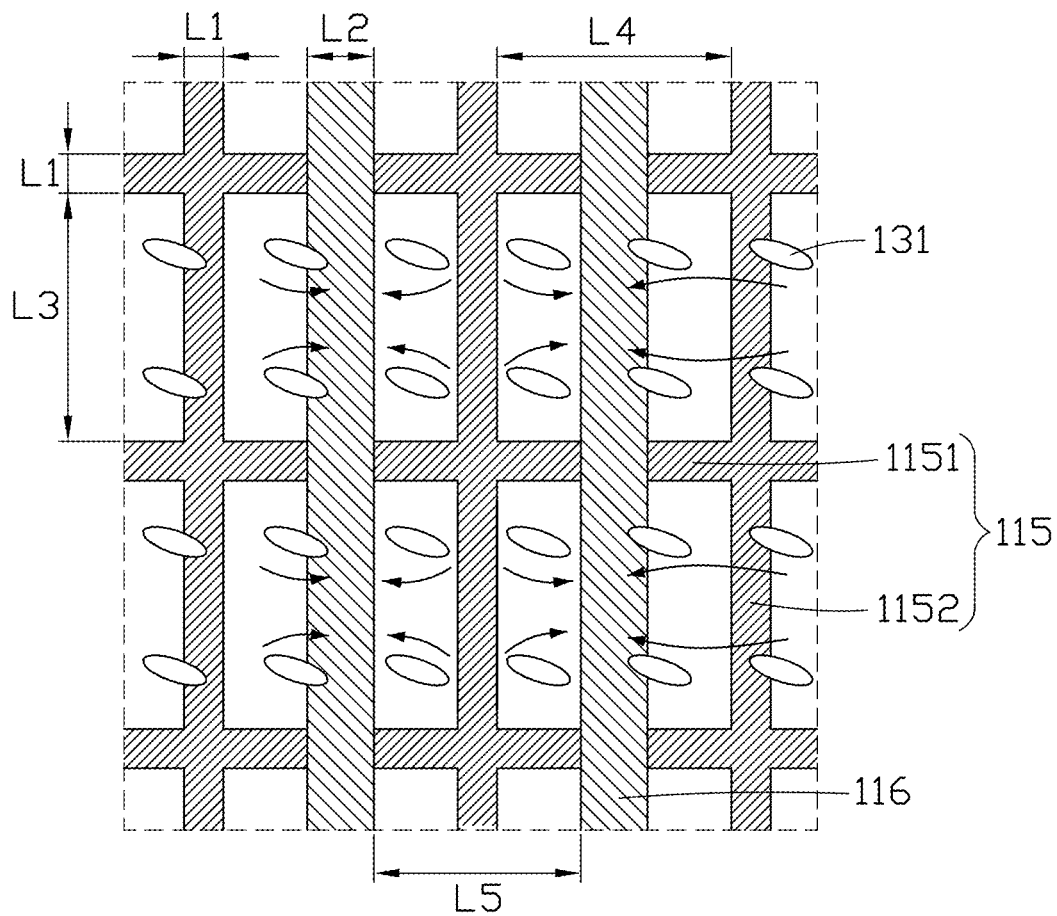
FIG. 3 is a partial enlarged view of a part of a plurality of sub-pixel areas of FIG. 2.
Figure 4A:
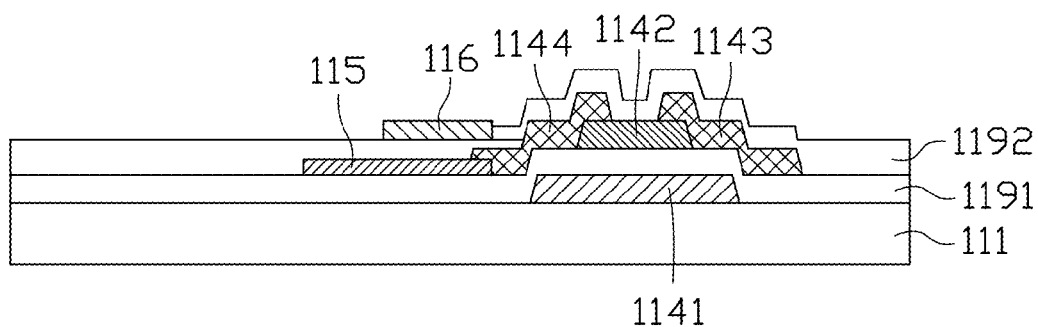
FIG. 4a is a cross-sectional view taken along the line A-A in FIG. 2.
Figure 4B:
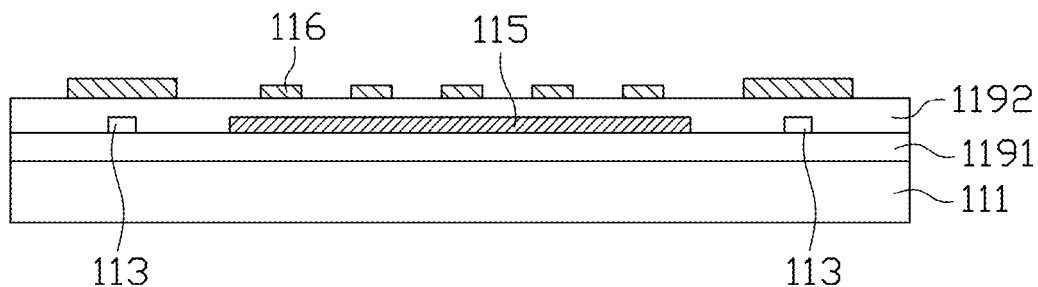
FIG. 4b is a cross-sectional view taken along the line B-B in FIG. 2.
Figure 4C:
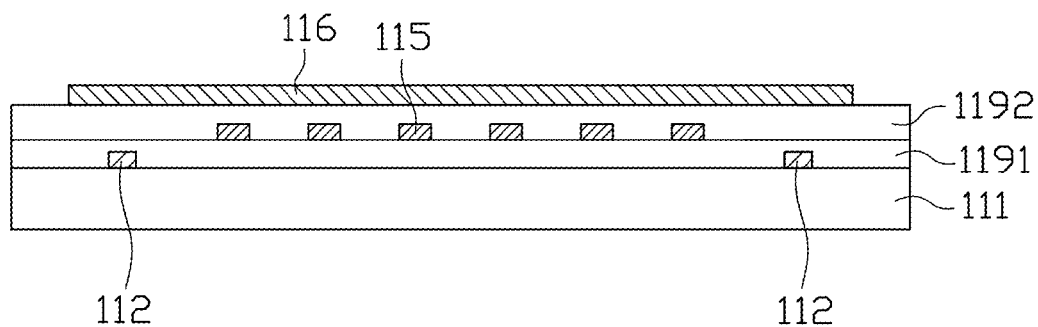
FIG. 4c is a cross-sectional view taken along the line C-C in FIG. 2.

Preferably, each pixel area P includes at least two sub-pixel areas P1. The number of the sub-pixel areas P1 shown in FIG. 2 is for purpose of illustration and description only, and it is not intended to be exhaustive or to be limiting to the precise form disclosed. The number of the sub-pixel areas P1 can be reasonably disposed according to size of actual LCD device and the manufacturing process level.

In this embodiment, a plurality of widths L1 of the first pixel-electrode portion 1151 and the second pixel-electrode portion 1152 can be disposed in a range from 2 μm to 5 μm. Due to positions directly above the first pixel-electrode portions 1151 and the second pixel-electrode portions 1152 being liable to generate disclination lines, it is better to have a smaller size for the width L1. However, limited to the actual manufacturing process capability, according to process yield requirements, the width L1 is preferably disposed or configured in the range from 2 μm to 5 μm. Preferably, the width L2 of the first common electrode 116 can be also disposed in the range from 2 μm to 5 μm.

In this embodiment, in the pixel area P, a gap width L3 defined between each two adjacent first pixel-electrode portions 1151 can be disposed in a range from 0 μm to 6 μm, and a gap width L4 defined between each two adjacent second pixel-electrode portions 1152 can also be disposed in a range from 0 μm to 6 μm. Such size or width ranges are disposed or configured based on the actual utilization of electric field, and it is difficult to achieve a desired or satisfactory result if the gap widths are too large. A gap width L5 defined between each two adjacent first common electrodes 116 can be disposed in a range from 3 μm to 8 μm. Limited to the actual manufacturing process capability, it is difficult to achieve a desired result if the gap width L5 exceeds the maximal value of the range, and it is hard to manufacture an actual LCD device product if the gap width L5 is configured below the minimal value of the range. Therefore, the gap width L5 is preferably disposed or configured in a range from 3 μm to 8 μm.

Referring to FIG. 1 again, the LCD device 100 further includes a second common electrode 121 in the second substrate 120. The second common electrode 121 can be a planar electrode, and is uniformly disposed on a base (not labeled) of the second substrate 120. The second common electrode 121 is a transparent electrode, and is made of transparent conductor materials, such as ITO, for example.

That is, in this embodiment, not only the pixel electrodes 115 but also the first common electrodes 116 are disposed in the first substrate 110, and the second common electrode 121 is further disposed in the second substrate 120. Therefore, a tri-electrode structure is formed in the pixel area P. In addition, a plurality of LC molecules 131 of the LC layer 130 are negative LC molecules.

Furthermore, the LCD device 100 still further includes a first alignment film 117, a first polarizer 118, a second alignment film 127, and a second polarizer 128. The first alignment film 117 and the first polarizer 118 are disposed in the first substrate 110, and the second alignment film 127 and the second polarizer 128 are disposed in the second substrate 120. Referring to FIG. 2, in this embodiment, a friction direction "a" of the first alignment film 117 is opposite to a friction direction "b" of the second alignment film 127. The direction of a polarization axis "c" of the first polarizer 118 is substantially perpendicular to the direction of a polarization axis "d" of the second polarizer 128.

In this embodiment, an angle "α" is defined between an arrangement direction of the first common electrodes 116 and the friction direction "b" of the second alignment film 127, and the angle "α" is in a range from 60 to 85 degrees. Due to the angle "α", a torque along a certain direction is initially applied to the LC molecules 131 of the LC layer 130. Therefore, the LC molecules 131 have fast response time and can twist along the certain direction based on a large amount of torque when the LCD device 100 operates, and a light transmissivity of the LCD device 100 is improved. Further, due to the friction directions "a" and "b", the LC molecules 131 have a pretilt angle in a range from 0 to 4 degrees. The pretilt angle makes the LC molecules 131 keep rotating in a horizontal plane under electric field, and improves the viewing angle.

Figure 5:
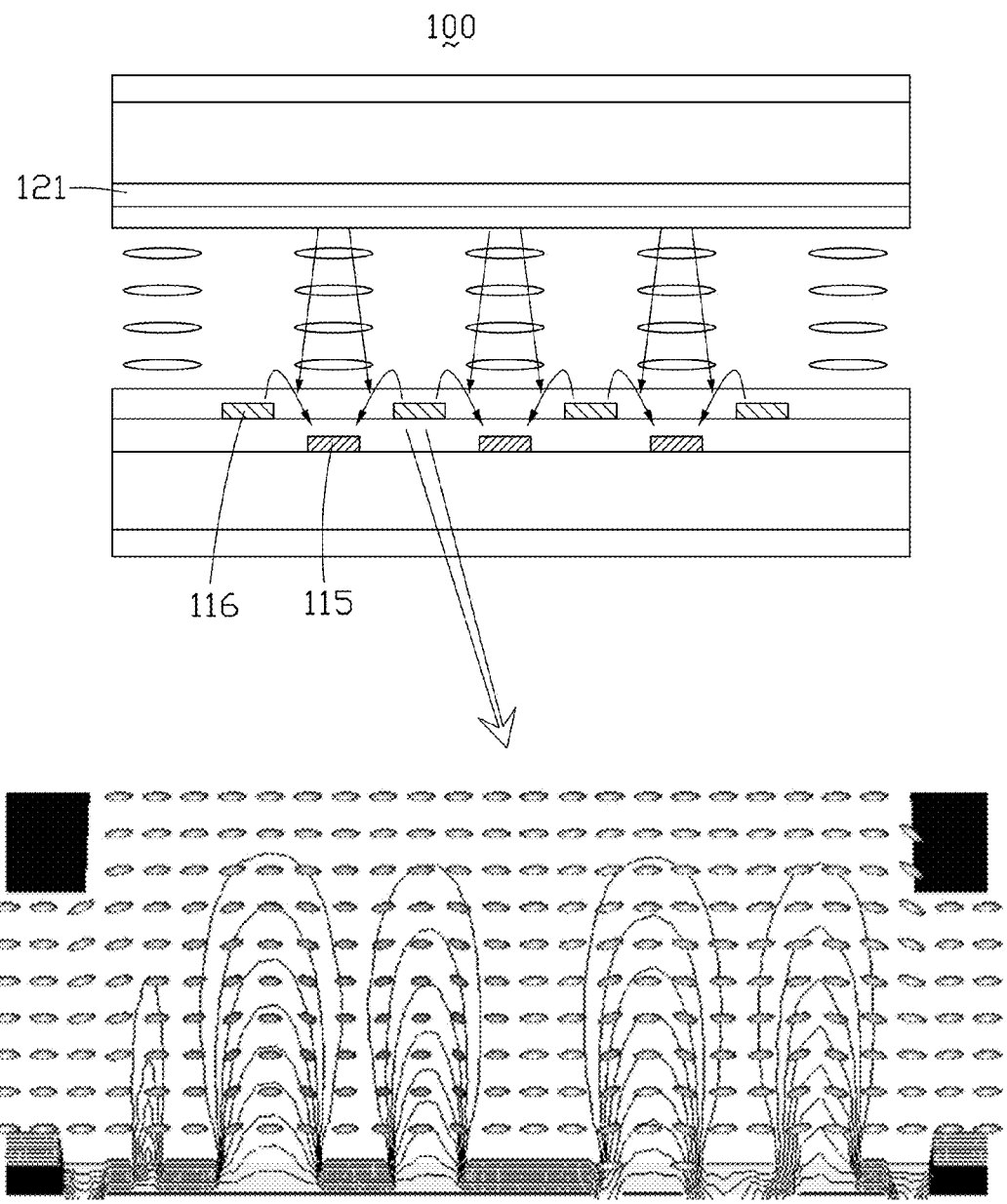
FIG. 5 is an equipotential effect view of the LCD device of FIG. 1.

FIG. 5 is an equipotential effect view of the LCD device 100. Referring to FIG. 5, a first electric field is formed between the pixel electrode 115 and the first common electrodes 116 of the first substrate 110, and a second electric field is formed between the pixel electrode 115 of the first substrate 110 and the second common electrode 121 of the second substrate 120. Therefore, electric potential of the LCD device 100 is different from that of the conventional IPS mode LCD device and FFS mode LCD device. The LC molecules 131 act under the effects of the first electric field and the second electric field, and can maintain certain arrangement in the horizontal plane without having large undesired tilt angle. Therefore, the transmissivity of the LCD device 100 is improved. The LCD device 100 is different from the conventional IPS and FFS mode LCD devices, and can play an important role in breaking the technical monopoly of the IPS and the FFS mode LCD devices.

Figure 6A:
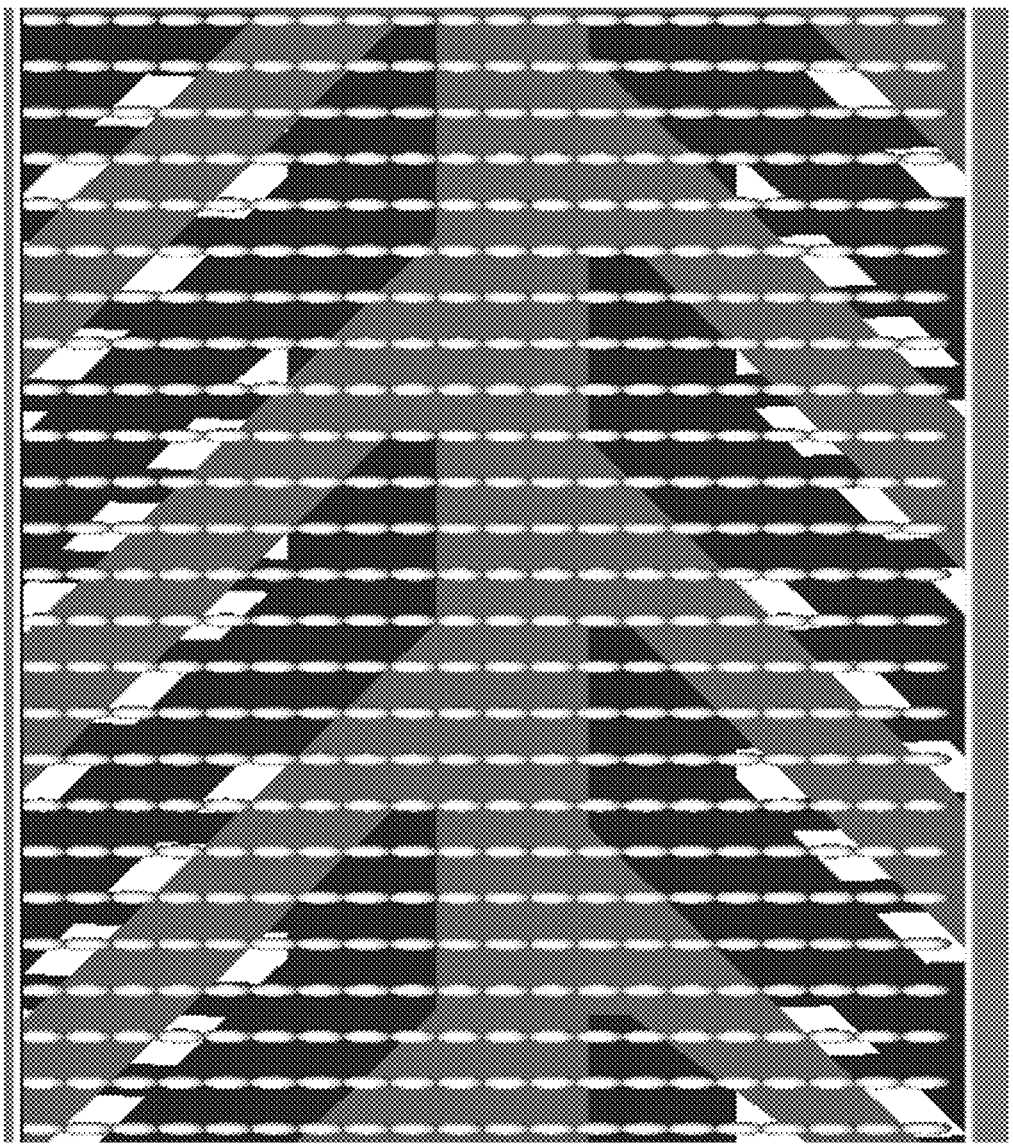
FIG. 6a is a director view of LC molecules of FIG. 1 when the voltage between the pixel electrode and the second common electrode of the LCD device is equal to 0 volt (V).
Figure 6B:
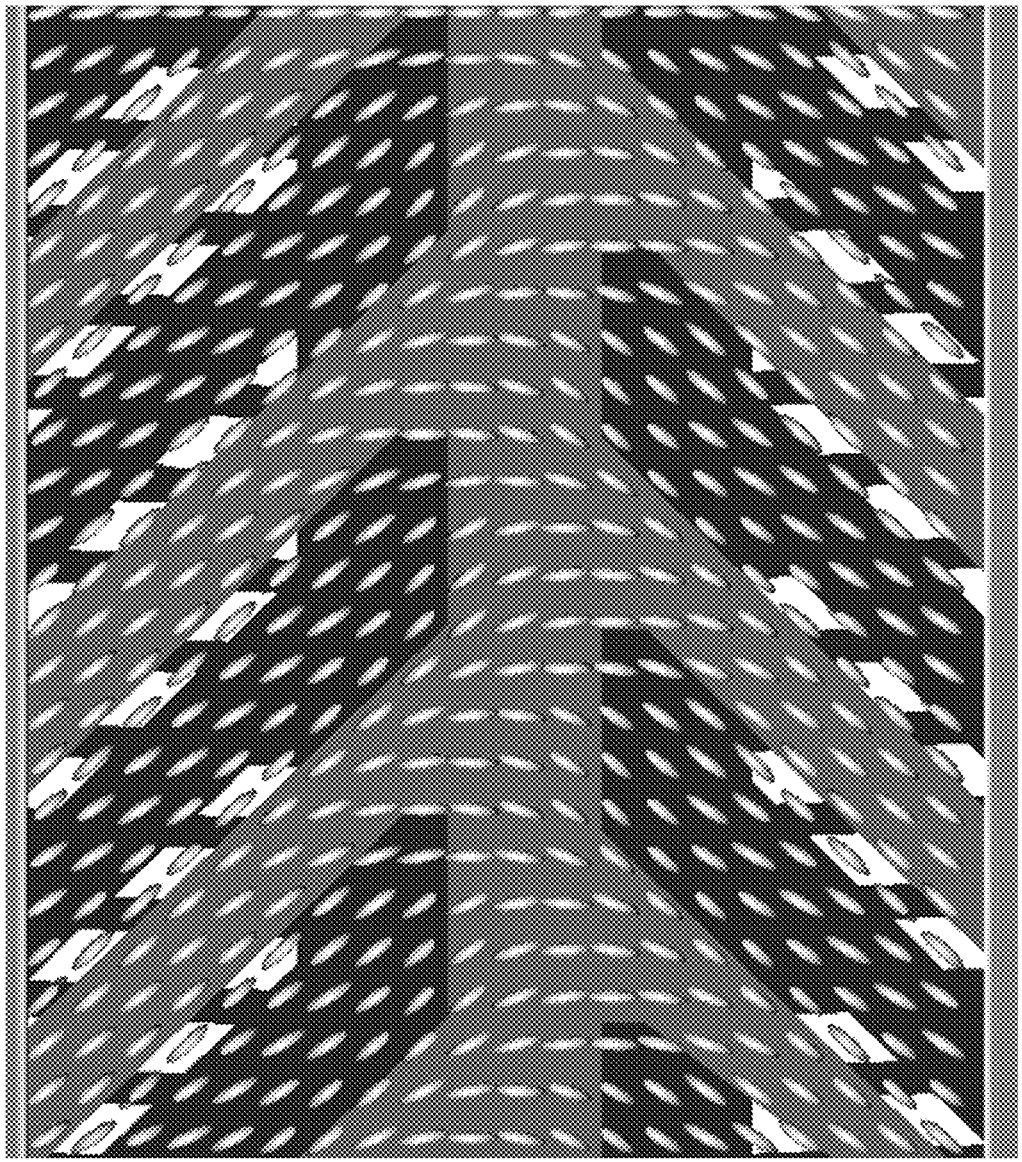
FIG. 6b is a director view of the LC molecules of FIG. 1 when the voltage between the pixel electrode and the second common electrode of the LCD device is equal to 5 V.

FIG. 6a is a director view of the LC molecules 131 of FIG. 1 when the voltage between the pixel electrode 115 and the second common electrode 121 of the LCD device 100 is equal to 0 V, and FIG. 6b is a director view of the LC molecules 131 of FIG. 1 when the voltage between the pixel electrode 115 and the second common electrode 121 of the LCD device 100 is equal to 5 V. In this embodiment, the LC molecules 131 of the LCD device 100 are negative LC molecules. Referring to FIG. 6a, when the voltage between the pixel electrode 115 and the second common electrode 121 is equal to 0 V, the LC molecules 131 of the LCD device 100 are uniformly and regularly arranged. Referring to FIG. 6b, when the voltage is equal to 5 V, the LC molecules 131 of the LCD device 100 twist smoothly under the effects of the two electric fields.

Figure 7A:
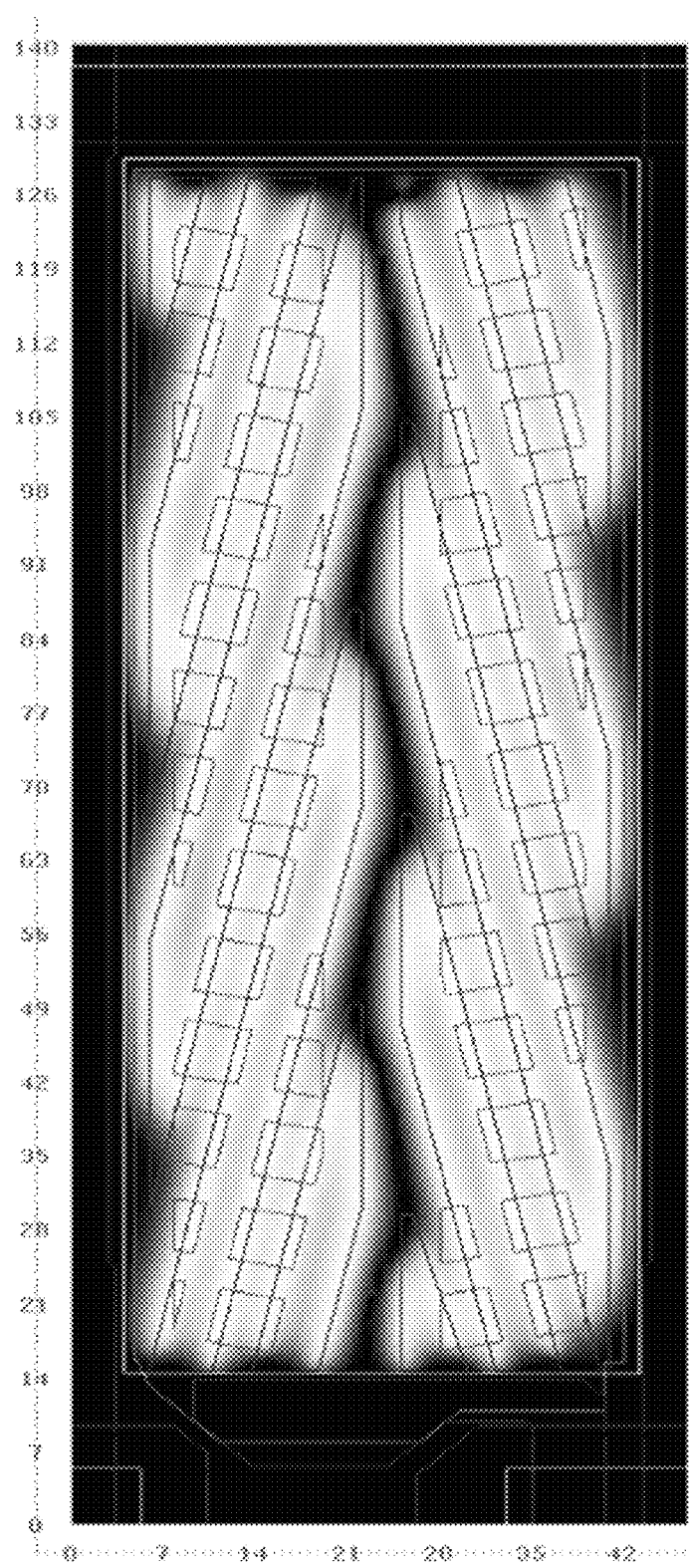
FIG. 7a is a view illustrating a light transmissivity of the LCD device of FIG. 1.
Figure 7B:
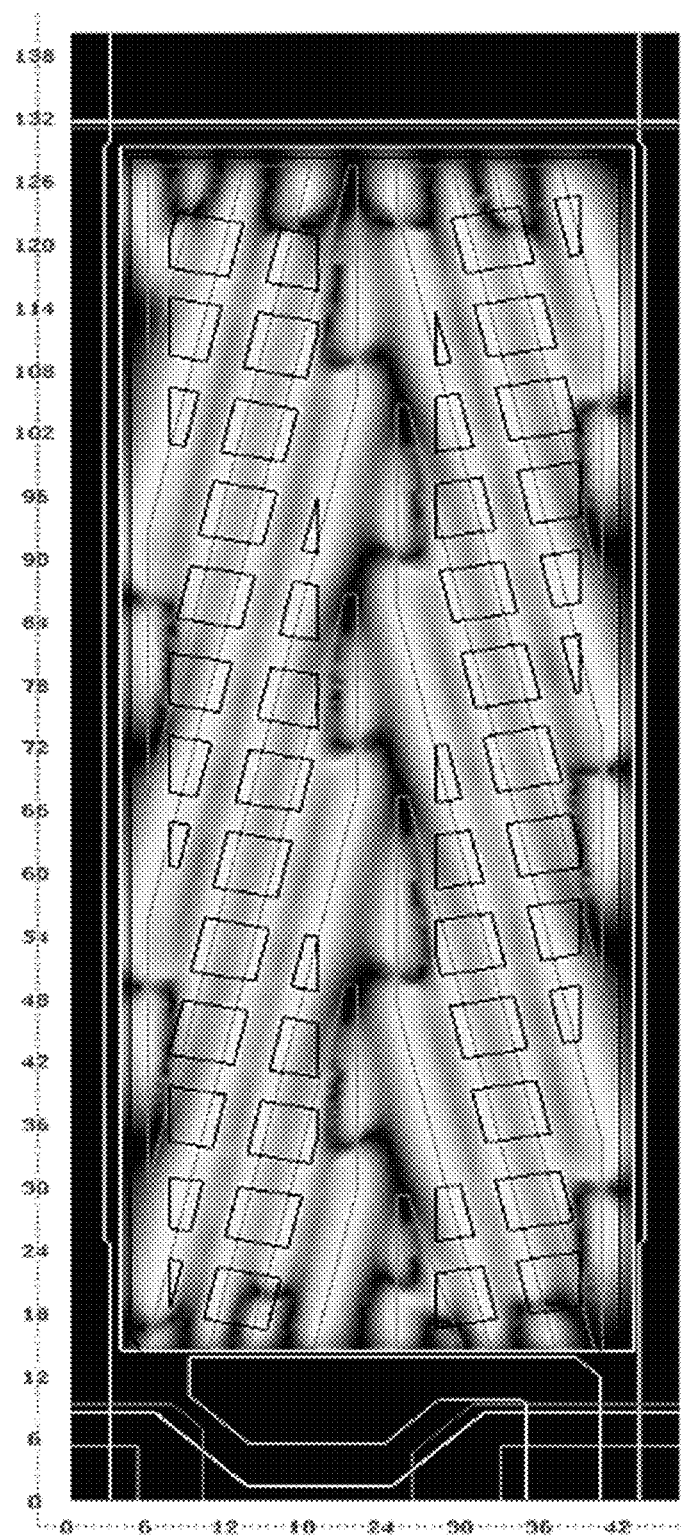
FIG. 7b is a view illustrating a light transmissivity of a conventional LCD device.
Figure 7C:
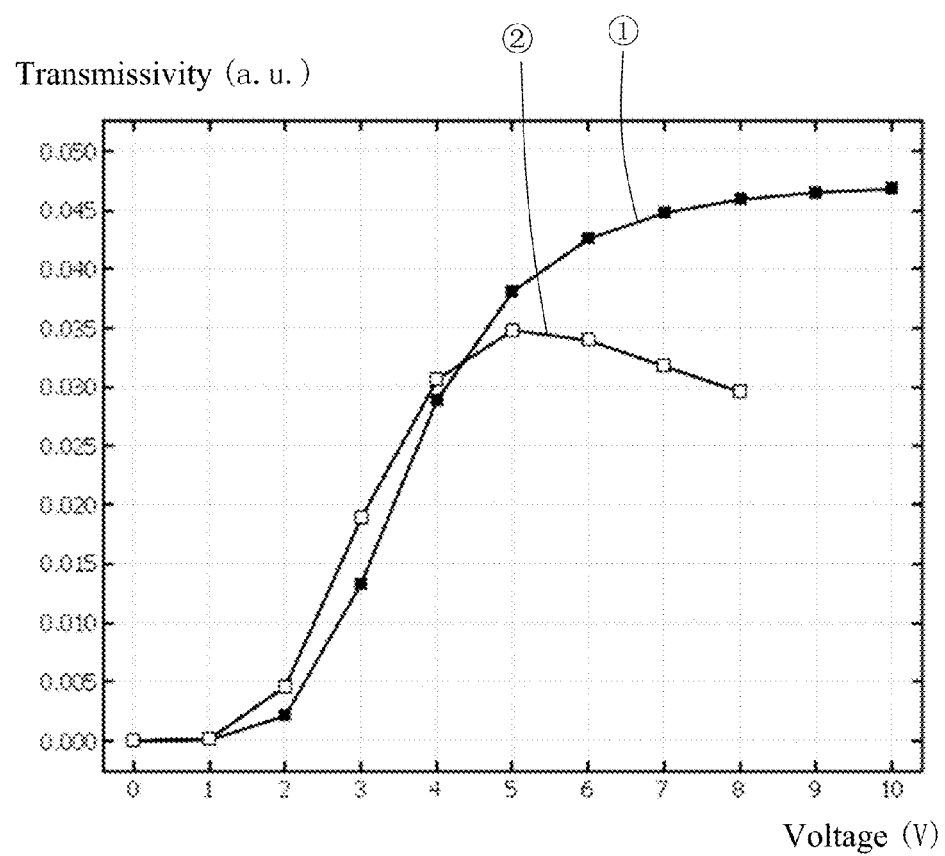
FIG. 7c is a comparison plot diagram of the LCD device of FIG. 1 and the conventional LCD device based on a relationship of transmissivity and voltage.

FIG. 7c is a comparison plot diagram of the LCD device 100 and the conventional LCD device based on a relationship of transmissivity and voltage. The LCD device 100 is shown in FIGS. 1-4, and includes the tri-electrode structure with negative LC molecules. The conventional LCD device as referred to herein has the meaning of or defined to be an LCD device without a second common electrode disposed in the second substrate and including a pixel electrode and a common electrode both disposed in the first substrate and having positive LC molecules. That is, the conventional LCD device includes a bi-electrode structure with positive LC molecules. FIG. 7a is view illustrating a light transmissivity of the LCD device 100, and FIG. 7b is a view illustrating a light transmissivity of the conventional LCD device. FIG. 7c is a comparison plot diagram between the LCD device 100 and the conventional LCD device based on a relationship of transmissivity and voltage. Referring to FIG. 7c, a curve ① comprising data points denotes a relationship of transmissivity and voltage of the LCD device 100, and a curve ② comprising data points denotes a relationship of transmissivity and voltage of the conventional LCD device. Referring to FIGS. 7a and 7b, in comparison with the conventional LCD device, the LCD device 100 has larger transmissivity and the brightness is more regular. In addition, referring to FIG. 7c, in comparison with the conventional LCD device, the LCD device 100 has larger transmissivity. For example, the transmissivity of the LCD device 100 is improved by about 10% when the voltage is equal to 6 V.

Figure 8:
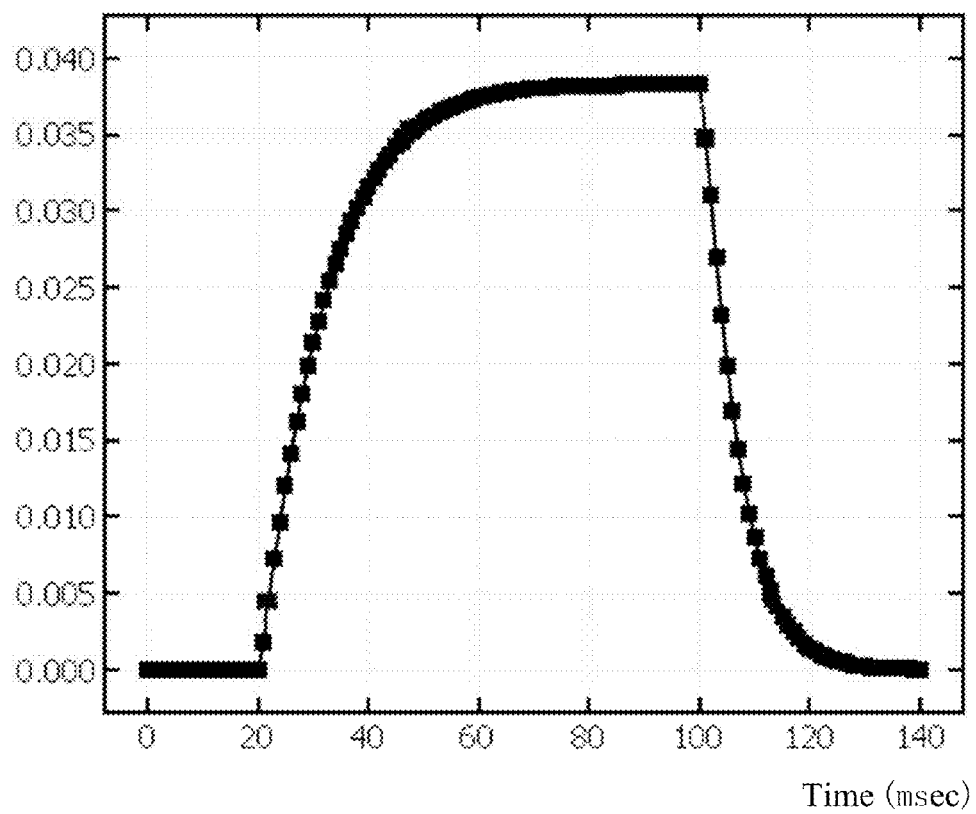
FIG. 8 is a plot diagram showing a relationship of transmissivity and the response time of the LCD device of FIG. 1.

FIG. 8 is a plot diagram indicating a relationship of transmissivity and time of the LCD device 100 of FIG. 1. Referring to FIG. 8, the LCD device 100 employs negative LC molecules, in a simulation experiment, a turn-on response time Ton of the LC molecules 131 is approximately equal to 23.9 ms, and a turn-off response time Toff is approximately equal to 13.41 ms. However, if a conventional LCD device employs negative LC molecules, the turn-on response time Ton usually exceeds 50 ms. In the simulation experiment, if a conventional FFS mode LCD device employs positive LC molecules, the turn-on response time Ton is approximately equal to 18.5 ms, and the turn-off response time Toff is approximately equal to 13.24 ms. That is, the turn-on response time Ton of the LCD device 100 in this embodiment of the present invention is larger than that of the conventional FFS mode LCD device employing the positive LC molecules, and the turn-off response time Toff of the LCD device 100 in this embodiment of the present invention is approximately the same as that of the conventional FFS mode LCD device employing the positive LC molecules. Therefore, the response time of the LCD device 100 employing the negative LC molecules is approximately the same as that of the LCD device employing the positive LC molecules, and the difference between the LCD device 100 and the LCD device employing the positive LC molecules is relatively minor. The response time of the LCD device 100 achieves a higher performance level compared to the conventional LCD devices.

Figure 9A:
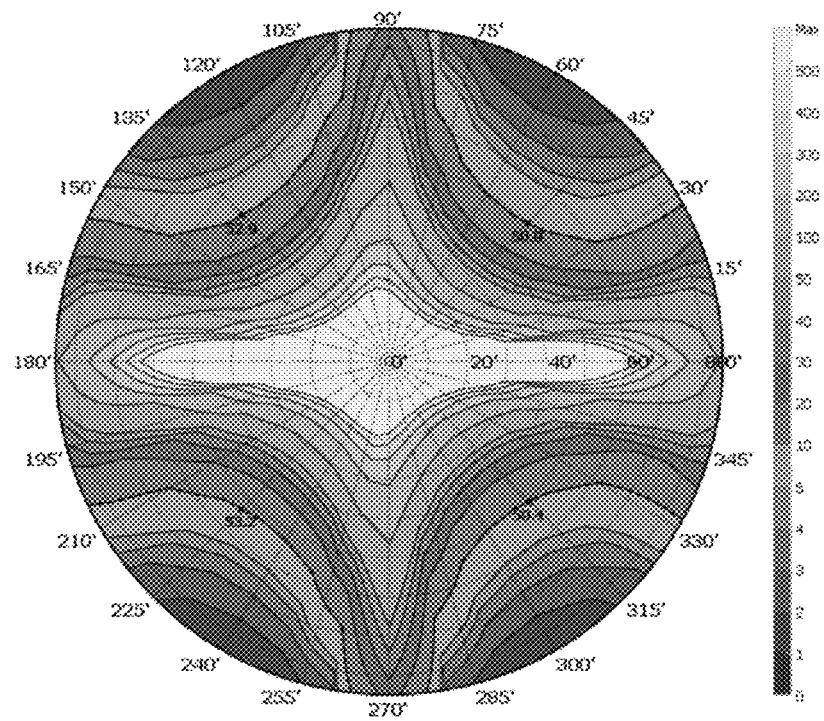
FIG. 9a is an isocontrast plot indicating a viewing angle range of the LCD device of FIG. 1.
Figure 9B:
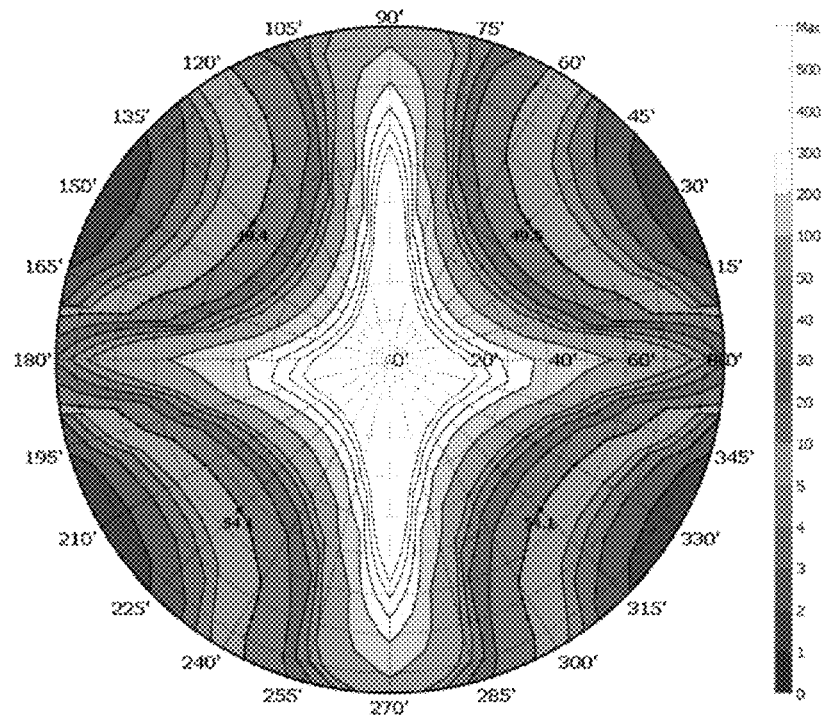
FIG. 9b is an isocontrast plot indicating a viewing angle range of the conventional LCD device.

FIG. 9a is a schematic isocontrast plot diagram showing a viewing angle range of the LCD device 100 of FIG. 1, and FIG. 9b is a isocontrast plot illustrating a viewing angle range of the conventional LCD device. The conventional LCD device without a second common electrode disposed in the second substrate includes positive LC molecules. That is, the conventional LCD device includes the bi-electrode structure with positive LC molecules. Referring to FIGS. 9a and 9b, a horizontal viewing angle of the LCD device 100 having negative LC molecules is larger than that of the conventional LCD device. Referring to FIG. 9a again, when a contrast ratio is equal to 10, some peripheral viewing angles of the LCD device 100 are respectively equal to 52.9 degrees, 50.0 degrees, 53.2 degrees, and 50.4 degrees. Referring to FIG. 9b again, when the contrast ratio is equal to 10, some peripheral viewing angles of the conventional LCD device are equal to 49.4 degrees, 49.5 degrees, 54.1 degrees, and 54.1 degrees, respectively. That is, the horizontal viewing angle of the LCD device 100 is larger than that of the conventional LCD device, and a viewing angle range of the LCD device 100 achieves a higher performance level compared to the conventional LCD devices.

Figure 10:
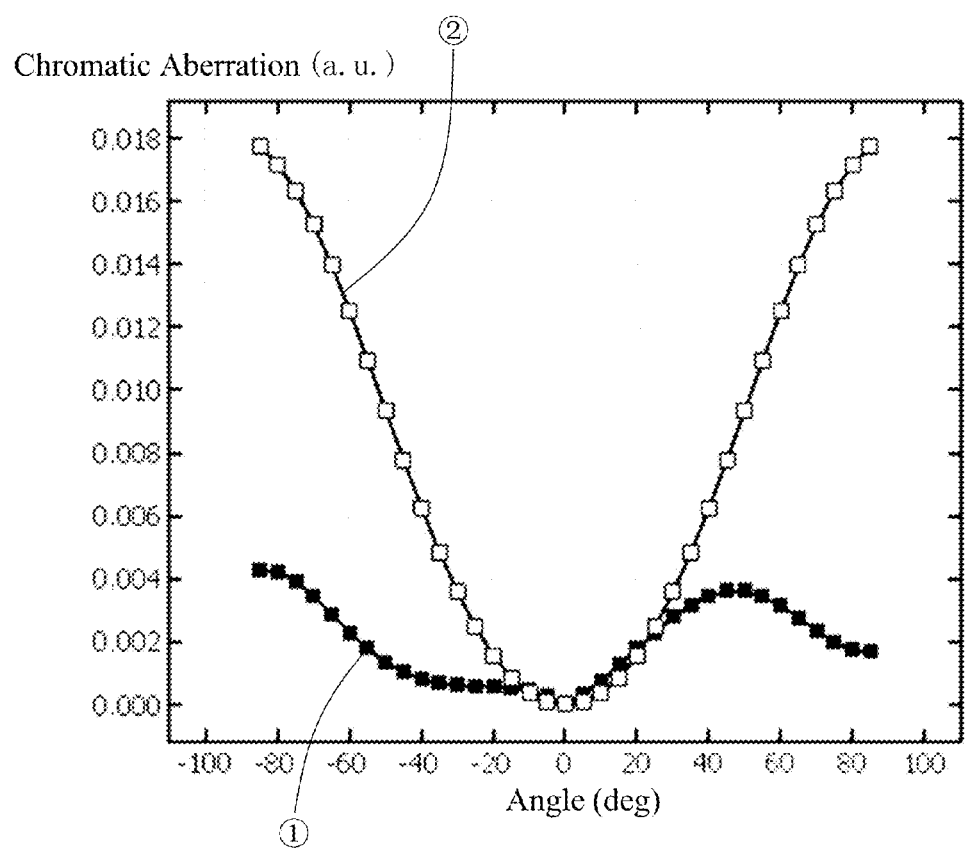
FIG. 10 is a comparison plot diagram of the LCD device of FIG. 1 and another conventional LCD device based on a relationship of chromatic aberration and angle.

FIG. 10 is a comparison plot diagram between the LCD device 100 of FIG. 1 and another conventional LCD device based on a relationship of chromatic aberration and angle. The conventional LCD device is a conventional IPS mode LCD device. Referring to FIG. 10, curves ① and ② are generated under the same simulated conditions, the curve ① denotes the relationship of chromatic aberration and angle of the LCD device 100, and the curve ② denotes a relationship of chromatic aberration and angle of the conventional LCD device. In comparison with the conventional IPS mode LCD device, when the angle varies, variation of the chromatic aberration of the LCD device 100 is smaller. That is, the effect of the chromatic aberration of the LCD device 100 is better as compared to that on the conventional LCD device.

The first pixel-electrode portions 1151, the second pixel-electrode portions 1152, and the first common electrodes 116 in any pixel area P are not limited to be strip-shaped, but they also can be bent-shaped in another alternative embodiment. When the LCD device operates, the LC molecules 131 can be rotated along at least two different directions in one pixel area P. That is, at least two domains are formed in one pixel area P. Therefore, a color shift phenomenon can be alleviated. The shape and arrangement of the pixel electrode and the first common electrodes of the LCD device of the present invention can be correspondingly adjusted according to an actual usage requirement, and form a multi-domain mode in one pixel area P. Therefore, the viewing angle is improved, and the LCD device of the present invention is not limited to the patent barriers of the conventional IPS mode LCD devices and FFS mode LCD devices.

In this embodiment, the first pixel-electrode portions 1151 are substantially parallel to the gate lines 112, and the second pixel-electrode portions 1152 are substantially parallel to the data lines 113. In another alternative embodiment, the first pixel-electrode portions 1151 can be substantially parallel to the data lines 113, and the second pixel-electrode portions 1152 can then be substantially parallel to the gate lines 112.

Figure 11A:
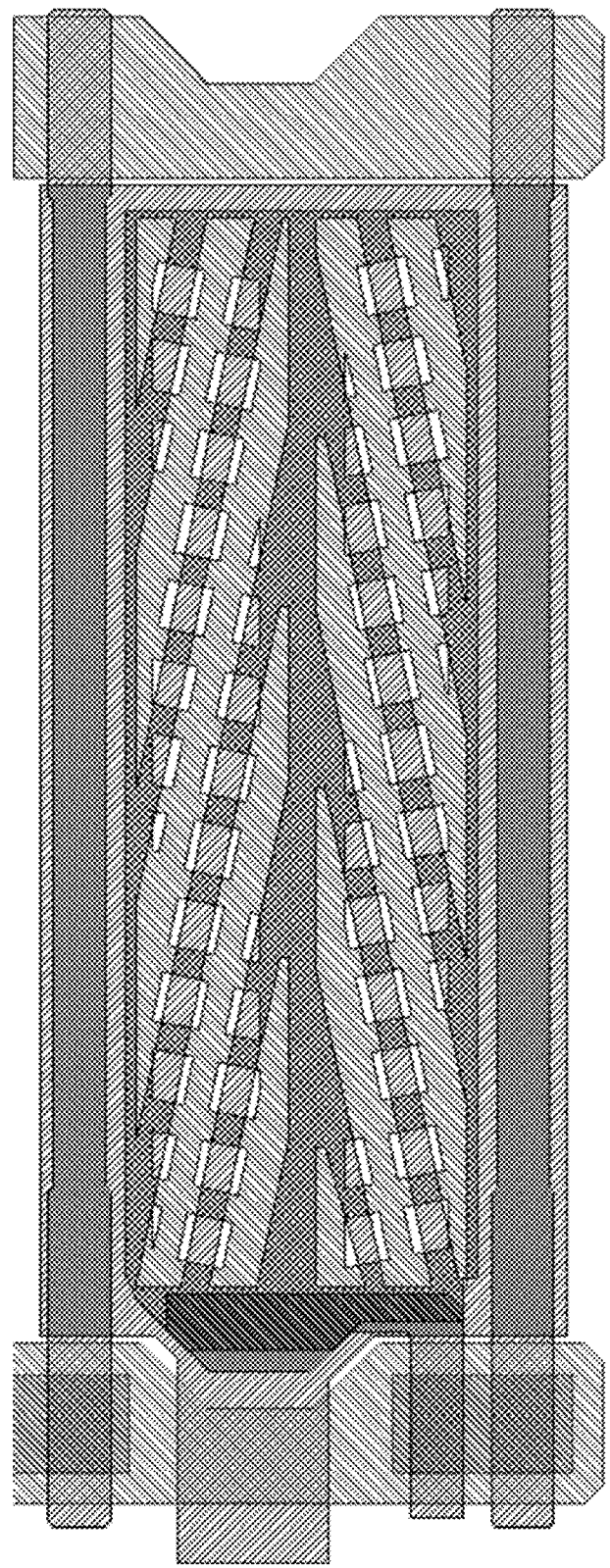
FIG. 11a is a schematic effect view of one pixel area having two domains of the LCD device of the present invention.
Figure 11B:
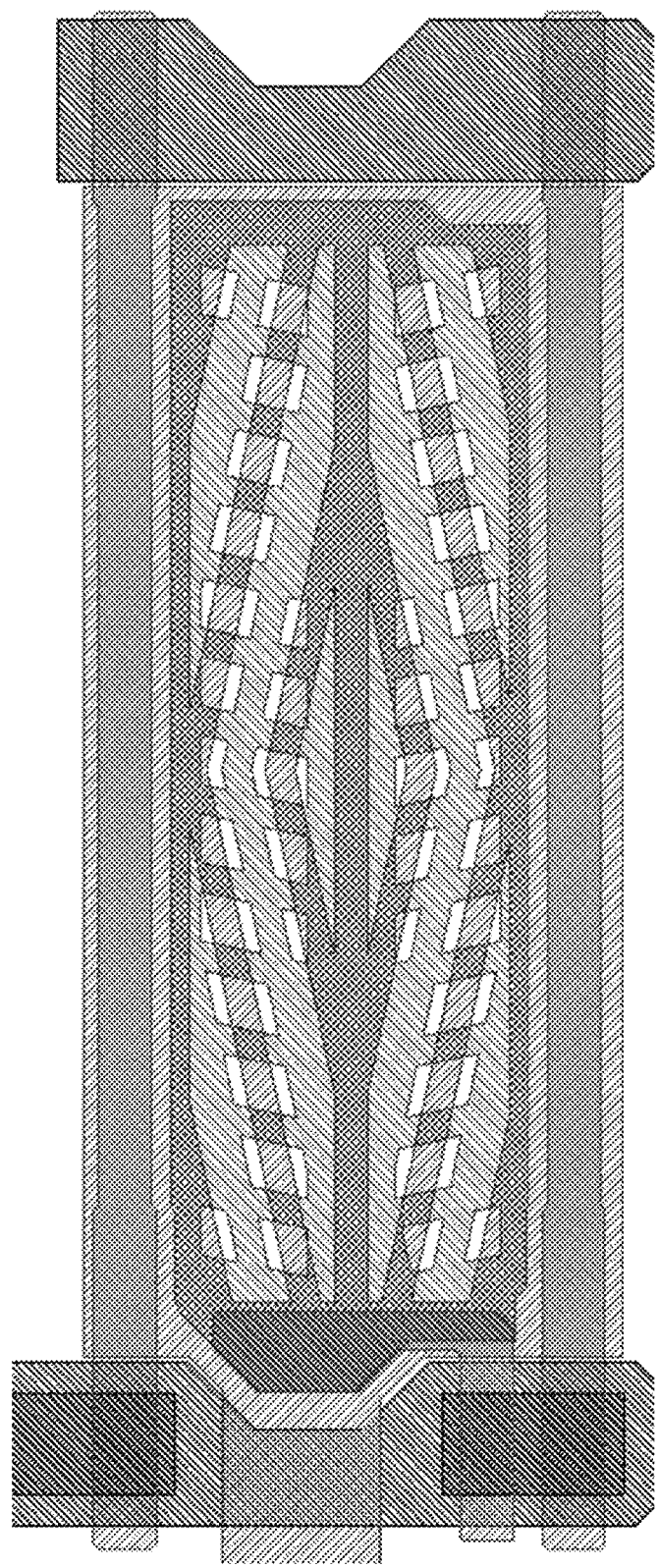
FIG. 11b is a schematic effect view of one pixel area having four domains of the LCD device of the present invention.
Figure 11C:
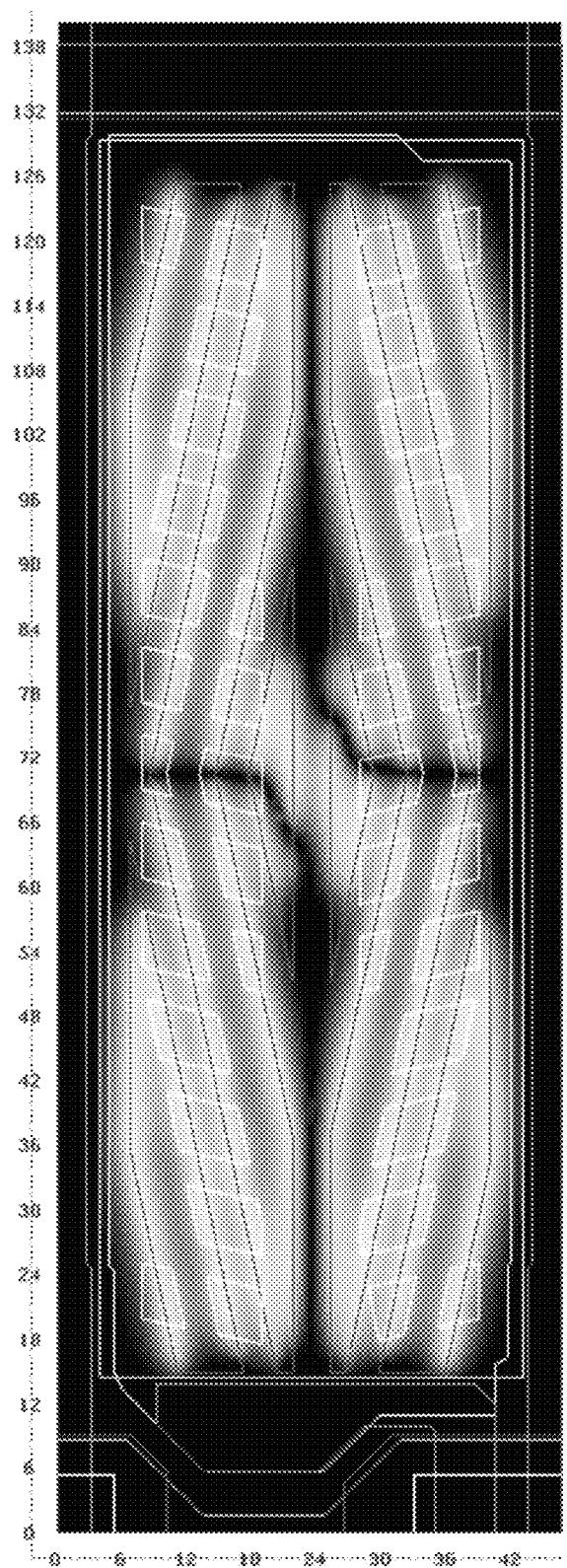
FIG. 11c is a view illustrating a light transmissivity of one pixel area having four domains of the LCD device of FIG. 11b.

FIG. 11a is a schematic effect view of one pixel area P having two domains of the LCD device of the present invention, FIG. 11b is a schematic effect view of one pixel area P having four domains of the LCD device of the present invention, and FIG. 11c is schematic effect view of transmissivity of one pixel area P having four domains of the LCD device of FIG. 11b. Referring to FIGS. 11a-11c, the LCD device of the present invention can form two or four domains in one pixel area P by disposing the extending directions and arrangement of the pixel electrode and the first common electrodes. When the LCD device of the present invention forms two domains in one pixel area P (see FIG. 11a), the LC molecules in one pixel area P rotate along the left and the right directions respectively in the two domains. When the LCD device of the present invention forms four domains in one pixel area P (see FIGS. 11b and 11c), the LC molecules in one pixel area P rotate along the top, the bottom, the left and the right directions in the four domains, respectively. Therefore, the color shift phenomenon is alleviated, and the display quality of the LCD device of the present invention is improved, by adding the number of the domains in one pixel area P.

In addition, the second common electrode is further disposed in the second substrate of the LCD device of the embodiments of the present invention. The second common electrode can be formed after the thinning treatment of the first and the second substrates, and the LCD device of the embodiments of the present invention does not need to cover another ITO layer on an outer surface of the second substrate to prevent from generating electrostatic mura. However, the conventional IPS mode LCD device and FFS mode LCD device need to do the thinning treatment of the substrates first, and then cover another ITO layer on the outer surface of the second substrate. Therefore, the manufacturing process of the LCD device of the embodiments of the present invention is simpler. Further, due to omitting the process of covering another ITO layer on an outer surface of the second substrate after the thinning treatment of the substrates, the manufacturing process of the LCD device of the embodiments of the present invention accordingly omits some transports of the substrates in the manufacturing process. Thus, the process yield is higher and the process time is shorter for the LCD devices in the embodiments of the present invention than the conventional IPS mode LCD device and FFS mode LCD device. Furthermore, the transmissivity of the LCD device of the present invention is larger, and power consumption is accordingly lower. Moreover, the LCD device of the present invention can form a multi-domain mode in one pixel area P by disposing the extending directions and arrangement of the pixel electrode and the first common electrodes. Therefore, the viewing angle is improved, the color shift phenomenon alleviates, and the display quality of the LCD device of the present invention is improved.

Figure 12:
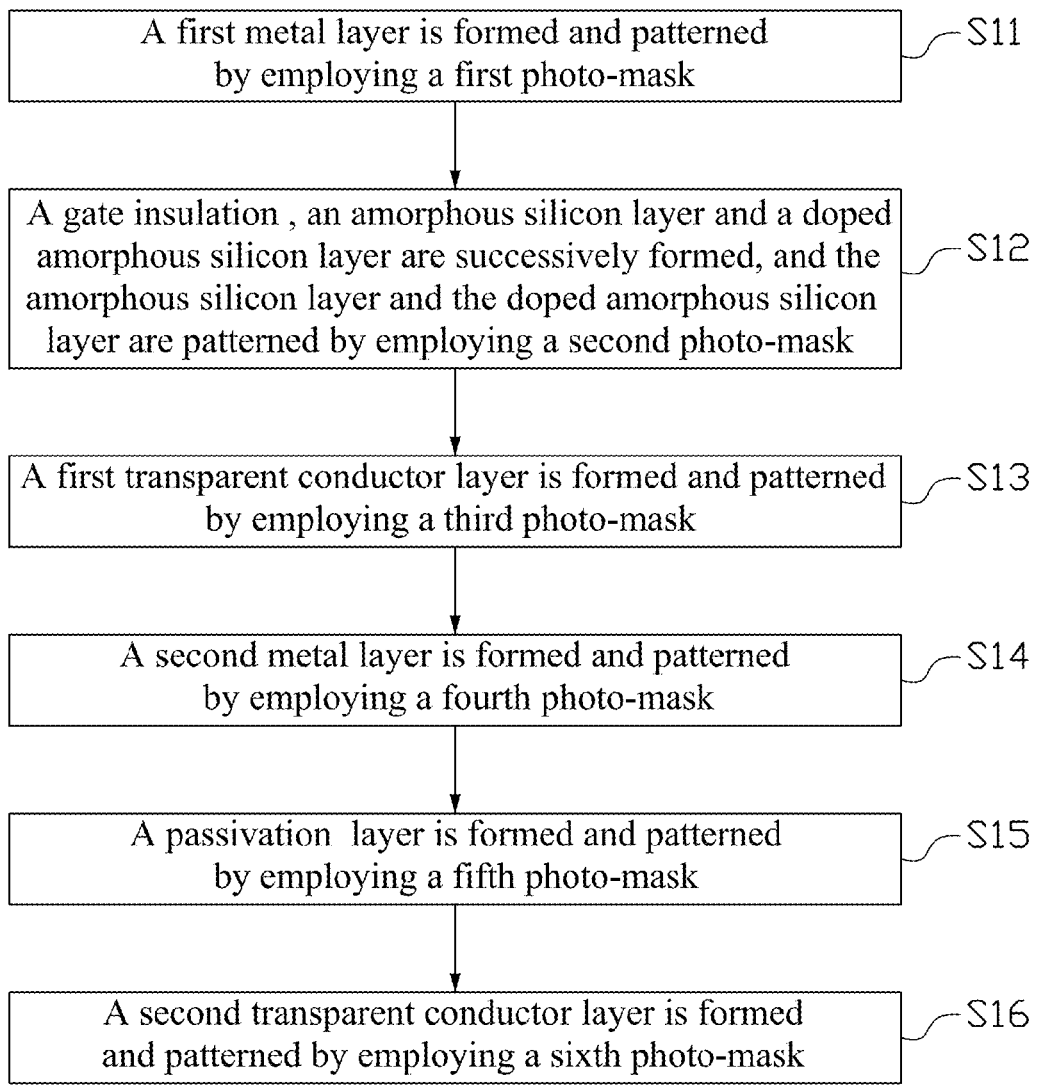
FIG. 12 is a flowchart summarizing an exemplary method for fabricating the first substrate of FIG. 1.

In addition, the first substrate 110 in the embodiment can be manufactured by employing six photo-mask processes described as follows. FIG. 12 is a flowchart summarizing an exemplary method for fabricating the first substrate 110 of the embodiment. The method includes the following steps.

Referring to FIG. 12 and FIGS. 2 and 4a-4c, in step S11, a first metal layer is formed and patterned by employing a first photo-mask.

In particular, the first metal layer is formed on the transparent base 111, and a first photo-resist layer is formed on the first metal layer. The first photo-resist layer is exposed and developed by the first photo-mask to form a first photo-resist pattern, and the first metal layer is etched to be patterned by using the first photo-resist pattern as a mask, to form the gate lines 112, the gate electrodes 1141 of the TFTs 114 and the common line. Then the first photo-resist pattern is removed.

In step S12, a gate insulation layer 1191, an amorphous silicon layer and a doped amorphous silicon layer are successively formed, and the amorphous silicon layer and the doped amorphous silicon layer are patterned by employing a second photo-mask.

In particular, the gate insulation layer 1191, the amorphous silicon layer, the doped amorphous silicon layer, and a second photo-resist layer are successively formed on the transparent base 111 having the patterned first metal layer. The second photo-resist layer is exposed and developed by the second photo-mask to form a second photo-resist pattern. The amorphous silicon layer and the doped amorphous silicon layer are etched to be patterned by using the second photo-resist pattern as a mask, to form the semiconductor layers 1142 of the TFTs 114. Then the second photo-resist pattern is removed.

In step S13, a first transparent conductor layer is formed and patterned by employing a third photo-mask.

In particular, the first transparent conductor layer and a third photo-resist layer are successively formed on the transparent base 111 having the patterned layers after the second photo-mask process. The third photo-resist layer is exposed and developed by the third photo-mask to form a third photo-resist pattern. The first transparent conductor layer is etched to be patterned by using the third photo-resist pattern as a mask, to form the pixel electrodes 115. Then the third photo-resist pattern is removed.

In step S14, a second metal layer is formed and patterned by employing a fourth photo-mask.

In particular, the second metal layer and a fourth photo-resist layer are successively formed on the transparent base 111 having the patterned layers after the third photo-mask process. The fourth photo-resist layer is exposed and developed by the fourth photo-mask to form a fourth photo-resist pattern. The second metal layer is etched to be patterned by using the fourth photo-resist pattern as a mask, to form the data lines 113, the source electrodes 1143 and the drain electrodes 1144 of the TFTs 114. The pixel electrodes 115 are directly and electrically coupled to the drain electrodes 1144 of the corresponding TFTs 114. Then the fourth photo-resist pattern is removed.

In step S15, a passivation layer 1192 is formed and patterned by employing a fifth photo-mask.

In particular, the passivation layer 1192 and a fifth photo-resist layer are successively formed on the transparent base 111 having the patterned layers after the fourth photo-mask process. The fifth photo-resist layer is exposed and developed by the fifth photo-mask to form a fifth photo-resist pattern. The passivation layer 1192 and the gate insulation layer 1191 are etched to be patterned by using the fifth photo-resist pattern as a mask, to form holes via the passivation layer 1192 and/or the gate insulation layer 1191 for electrically coupling circuit elements. Then the fifth photo-resist pattern is removed.

In step S16, a second transparent conductor layer is formed and patterned by employing a sixth photo-mask.

In particular, the second transparent conductor layer and a sixth photo-resist layer are successively formed on the transparent base 111 having the patterned layers after the fifth photo-mask process. The sixth photo-resist layer is exposed and developed by the sixth photo-mask to form a sixth photo-resist pattern. The second transparent conductor layer is etched to be patterned by using the sixth photo-resist pattern as a mask, to form the first common electrodes 116 electrically coupled to each other and electrically coupled to the common line formed in step S11. Then the sixth photo-resist pattern is removed.

After the above steps S11-S16 are performed, the first substrate 110 in this embodiment are formed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A liquid crystal display (LCD) device, comprising:
a first substrate;
a second substrate opposite to the first substrate; and
a liquid crystal (LC) layer, sandwiched between the first substrate and the second substrate, the LC layer comprising negative LC molecules;
the first substrate comprising:
a plurality of gate lines; and
a plurality of data lines, the gate lines and the data lines being intersected with each other to define a plurality of pixel areas;
each of the pixel areas comprising:
a pixel electrode, comprising:
a plurality of first pixel-electrode portions; and
a plurality of second pixel-electrode portions, the first pixel-electrode portions and the second pixel-electrode portions being electrically coupled together, the first pixel-electrode portions and the second pixel-electrode portions being arranged at a same layer, and the first pixel-electrode portions and the second pixel-electrode portions being intersected with each other to form a mesh-shaped structure and define a plurality of sub-pixel areas; and
a plurality of first common electrodes electrically coupled with each other, the pixel electrode and the first common electrodes being arranged at different layers respectively;

the second substrate comprising a second common electrode;

wherein the first pixel-electrode portions are strip-shaped and are substantially parallel to each other, the second pixel-electrode portions are strip-shaped and are substantially parallel to each other, the first common electrodes are strip-shaped and are substantially parallel to each other, and the first common electrodes are substantially parallel to the second pixel-electrode portions;

wherein each two adjacent of the first pixel-electrode portions has a gap therebetween which is in a range from 0 µm to 6 µm in width, each two adjacent of the second pixel-electrode portions has a gap width therebetween which is in the range from 0 µm to 6 µm, and each two adjacent of the first common electrodes has a gap width therebetween in the range from 3 µm to 8 µm.

2. The LCD device of claim 1, wherein the pixel electrode is disposed below the first common electrodes, and the first common electrodes are closer to the LC layer than the pixel electrode.

3. The LCD device of claim 1, wherein the first pixel-electrode portions are substantially perpendicular to the second pixel-electrode portions, the first pixel-electrode portions are substantially parallel to one of the gate lines and the data lines, and the second pixel-electrode portions are substantially parallel to the other of the gate lines and the data lines.

4. The LCD device of claim 1, wherein an angle is defined between the first common electrodes and the first pixel-electrode portions, and is in a range from 50 to 150 degrees.

5. The LCD device of claim 1, further comprising:
a first alignment film, disposed in the first substrate and having a first friction direction; and
a second alignment film, disposed in the second substrate and having a second friction direction opposite to the first friction direction;
wherein an angle is defined between an arrangement direction of the first common electrodes and the second friction direction, and is in a range from 60 to 85 degrees.

6. The LCD device of claim 1, further comprising:
a first polarizer, disposed in the first substrate and having a first polarization axis; and
a second polarizer, disposed in the second substrate and having a second polarization axis substantially perpendicular to the first polarization axis.

7. The LCD device of claim 1, wherein the LC molecules of the LC layer have a pretilt angle in a range from 0 to 4 degrees.

8. The LCD device of claim 1, wherein each of the pixel area comprises at least two sub-pixel areas.

9. A liquid crystal display (LCD) device, comprising:
a first substrate;
a second substrate opposite to the first substrate; and
a liquid crystal (LC) layer, sandwiched between the first substrate and the second substrate, the LC layer comprising negative LC molecules;
the first substrate comprising:
a plurality of gate lines; and
a plurality of data lines, the gate lines and the data lines being intersected with each other to define a plurality of pixel areas;
each of the pixel areas comprising:
a pixel electrode, comprising:
a plurality of first pixel-electrode portions; and
a plurality of second pixel-electrode portions, the first pixel-electrode portions and the second pixel-electrode portions being electrically coupled together, the first pixel-electrode portions and the second pixel-electrode portions being arranged at a same layer, and the first pixel-electrode portions and the second pixel-electrode portions being intersected with each other to form a mesh-shaped structure and define a plurality of sub-pixel areas; and
a plurality of first common electrodes electrically coupled with each other, the pixel electrode and the first common electrodes being arranged at different layers respectively;
the second substrate comprising a second common electrode;
wherein the first pixel-electrode portions are strip-shaped and are substantially parallel to each other, the second pixel-electrode portions are strip-shaped and are substantially parallel to each other, the first common electrodes are strip-shaped and are substantially parallel to each other, and the first common electrodes are substantially parallel to the second pixel-electrode portions;
wherein each of the first pixel-electrode portions has a width in a range from 2 µm to 5 µm, each of the second pixel-electrode portions has a width in a range from 2 µm to 5 µm, and each of the first common electrodes has a width in a range from 2 µm to 5 µm.

10. A liquid crystal display (LCD) device, comprising:
a plurality of gate lines; and
a plurality of data lines intersected with the gate lines to define a plurality of pixel areas;
each of the pixel areas comprising:
a pixel electrode, comprising:
a plurality of first pixel-electrode portions; and
a plurality of second pixel-electrode portions, the first pixel-electrode portions and the second pixel-electrode portions being electrically coupled together, the first pixel-electrode portions and the second pixel-electrode portions being arranged at a same layer, and the first pixel-electrode portions being intersected with the second pixel-electrode portions to define a plurality of sub-pixel areas; and
a plurality of first common electrodes electrically coupled with each other, the pixel electrode and the first common electrodes being arranged at different layers in a same substrate;
the LCD device further comprising:
a second common electrode arranged in an another substrate opposite to the substrate where the pixel electrode and the first common electrodes are arranged in;
wherein each of the first pixel-electrode portions has a width in a range from 2 µm to 5 µm, each of the second pixel-electrode portions has a width in a range from 2 µm to 5 µm, and each of the first common electrodes has a width in a range from 2 µm to 5 µm.

11. The LCD device of claim 10, further comprising:
a liquid crystal (LC) layer sandwiched between the two substrates, wherein the LC layer comprises negative LC molecules.

12. The LCD device of claim 10, wherein the first pixel-electrode portions are strip-shaped and are substantially parallel to each other, the second pixel-electrode portions are strip-shaped and are substantially parallel to each other, the first common electrodes are strip-shaped and are substantially parallel to each other, and the first common electrodes are substantially parallel to the second pixel-electrode portions.

13. The LCD device of claim 12, wherein the first pixel-electrode portions are substantially perpendicular to the second pixel-electrode portions, the first pixel-electrode portions are substantially parallel to one of the gate lines and the data lines, and the second pixel-electrode portions are substantially parallel to the other of the gate lines and the data lines.

14. The LCD device of claim 13, wherein an angle is defined between the first common electrodes and the first pixel-electrode portions, and is in a range from 50 to 150 degrees.

15. The LCD device of claim 10, further comprising:
- a first alignment film, disposed in the substrate and having a first friction direction; and
- a second alignment film, disposed in the another substrate and having a second friction direction opposite to the first friction direction;
- wherein an angle is defined between an arrangement direction of the first common electrodes and the second friction direction, and is in a range from 60 to 85 degrees.

16. The LCD device of claim 10, wherein each of the pixel area comprises at least two sub-pixel areas.

17. The LCD device of claim 10, wherein each of the pixel area comprises four sub-pixel areas.

18. The LCD device of claim 10, wherein an insulation layer is disposed between the pixel electrode and the first common electrodes.

\* \* \* \* \*